Patented May 23, 1933

1,910,617

UNITED STATES PATENT OFFICE

CHARLES LEU, OF BEX, SWITZERLAND, ASSIGNOR TO SOCIÉTÉ ANONYME POUR LE TRAITEMENT DES MINERAIS ALUMINO-POTASSIQUES, OF LAUSANNE, SWITZERLAND, A CORPORATION OF SWITZERLAND

PROCESS OF MANUFACTURE OF PHOSPHATIC FERTILIZERS

No Drawing. Application filed February 12, 1931, Serial No. 515,411, and in Switzerland February 17, 1930.

The fertilizer in view is a mixture of calcium phosphates, partially soluble in water, partially soluble in the ammonium citrate, and partially soluble in citric acid. It is prepared by melting natural tricalcium phosphate and in running the melted mass into an aqueous solution of phosphoric acid, the water of which is thus partially volatilized.

The melting of tricalcium phosphate may be effected in an electric oven for example, but in being careful not to reduce the phosphoric acid and thus produce phosphide of calcium.

The quantities of natural phosphate and phosphoric acid to be employed depend upon the ratio it is desired to obtain, in the finished product, between the phosphate soluble in water, the phosphate soluble in ammonium citrate and the phosphate soluble in citric acid. The former are approximately calculated by using the following theoretical equations:

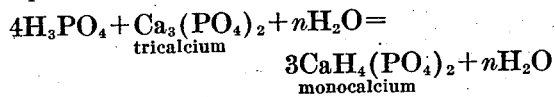

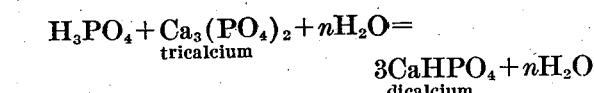

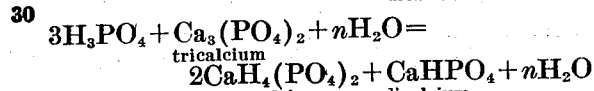

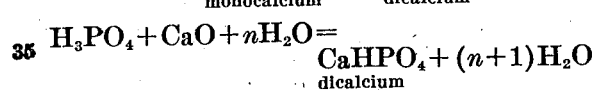

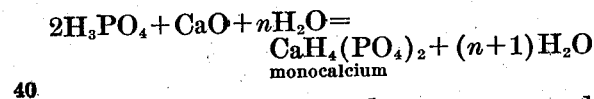

although these formulæ do not correspond exactly to the composition of all the salts. In fact, when it is proposed to obtain pure dicalcium phosphate, a small proportion of monocalcium and a greater proportion of complex phosphates soluble in citric acid, are always found in the final product.

It is necessary to take into consideration, in the calculation, the calcium oxide (combined with weaker acids than phosphoric acid) which natural phosphates always contain.

As it may be seen, the ratio between the monocalcium phosphate and the phosphates soluble in citrate and in the citric acid of the finished product may vary from nearly 0 to about 1 according to the choice of the manufacturer.

The same result may be obtained if the phosphoric acid solution is first fortified with a salt of phosphoric acid which then remains mixed in the product obtained.

I claim:

1. Process of preparation of phosphatic fertilizers essentially constituted by a mixture of monocalcium phosphate, dicalcium phosphate and complex phosphates soluble in citric acid, this process consisting in running the suitable quantity of natural phosphate of calcium in fusion into a phosphoric acid solution.

2. Process of preparation of phosphatic fertilizers essentially constituted by a mixture of monocalcium phosphate, dicalcium phosphate and complex phosphates soluble in citric acid, comprising melting natural tricalcium phosphate, running the melted mass into an aqueous solution of phosphoric acid, drying and crushing the obtained product.

3. Process of preparing phosphatic fertilizers essentially constituted by a mixture of monocalcium phosphate, dicalcium phosphate and complex phosphates soluble in citric acid, comprising melting natural tricalcium phosphate, running the melted mass into an aqueous solution of phosphoric acid, which solution has first been fortified with a salt of phosphoric acid.

In testimony whereof I have affixed my signature.

CHARLES LEU.